United States Patent
Korte et al.

(10) Patent No.: US 9,832,243 B2
(45) Date of Patent: Nov. 28, 2017

(54) DATA FEED RESOURCE RESERVATION SYSTEM

(71) Applicant: LEVEL 3 COMMUNICATIONS, LLC, Broomfield, CO (US)

(72) Inventors: Ryan Korte, Louisville, CO (US); Billy Hoffmann, Tulsa, OK (US); Drew Hall, Owasso, OK (US); David Balda, Broken Arrow, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/186,124

(22) Filed: Jun. 17, 2016

(65) Prior Publication Data

US 2016/0294901 A1   Oct. 6, 2016

Related U.S. Application Data

(63) Continuation of application No. 12/640,287, filed on Dec. 17, 2009, now abandoned.

(51) Int. Cl.
| | |
|---|---|
| *H04N 7/173* | (2011.01) |
| *H04L 29/06* | (2006.01) |
| *H04N 21/222* | (2011.01) |
| *H04N 21/24* | (2011.01) |
| *H04N 21/63* | (2011.01) |
| *H04L 12/26* | (2006.01) |
| *H04L 12/911* | (2013.01) |

(52) U.S. Cl.
CPC ...... *H04L 65/4076* (2013.01); *H04L 43/0882* (2013.01); *H04L 47/74* (2013.01); *H04N 21/2221* (2013.01); *H04N 21/2402* (2013.01); *H04N 21/63* (2013.01)

(58) Field of Classification Search
CPC ......... H04N 21/47202; H04N 7/17318; H04N 7/17336; H04N 21/2402; H04N 21/25891
USPC .... 725/58, 87–88, 91, 93–98, 102–103, 116, 725/146
See application file for complete search history.

(56) References Cited

U.S. PATENT DOCUMENTS

| | | |
|---|---|---|
| 4,720,850 A | 1/1988 | Oberiander et al. |
| 5,563,648 A | 10/1996 | Menand et al. |
| 7,412,532 B2 | 8/2008 | Gondhalekar et al. |

(Continued)

FOREIGN PATENT DOCUMENTS

| | | |
|---|---|---|
| CN | 1714577 A | 12/2005 |
| CN | 101282460 A | 10/2008 |

(Continued)

OTHER PUBLICATIONS

Chinese Examination Report, dated Jun. 3, 2015, Application No. 201080057167.1, filed Nov. 18, 2010; 13 pgs.
Chinese Examination Report, dated Sep. 16, 2014, Application No. 2010800571671, filed Nov. 18, 2010; 13 pgs.
Chinese Third Examination Report, dated Jan. 25, 2016, Application No. 201080057167, filed Nov. 18, 2016; 4 pgs.
European Examination Report, dated Apr. 6, 2016, Application No. 10842422.7, filed Nov. 18, 2010; 8 pgs.
European Examination Report, dated Jul. 17, 2015, Application No. 10842422.7, filed Nov. 18, 2010; 9 pgs.

(Continued)

*Primary Examiner* — Jason Salce

(57) ABSTRACT

An embodiment of a method includes receiving a subscription request specifying one or more destination sites to receive a video feed and respective times at which to deliver the video feed to each of the one or more destination sites over a terrestrial network, wherein respective delivery times are within a publication time range in which the video feed will be available, and configuring available resources to deliver the requested video feed to the one or more destination sites at the respective times.

10 Claims, 13 Drawing Sheets

(56) References Cited

U.S. PATENT DOCUMENTS

| | | | |
|---|---|---|---|
| 7,698,724 | B1 | 4/2010 | Day |
| 2002/0038359 | A1 | 3/2002 | Ihara et al. |
| 2002/0059573 | A1 | 5/2002 | Nishio et al. |
| 2002/0075871 | A1 | 6/2002 | Blanc et al. |
| 2002/0184630 | A1 | 12/2002 | Nishizawa et al. |
| 2003/0061619 | A1 | 3/2003 | Giammaressi |
| 2004/0133907 | A1 | 7/2004 | Rodriguez et al. |
| 2005/0010957 | A1 | 1/2005 | Muller et al. |
| 2005/0125836 | A1 | 6/2005 | Estevez et al. |
| 2005/0229228 | A1 | 10/2005 | Relan et al. |
| 2006/0125836 | A1 | 6/2006 | Lojou |
| 2007/0011709 | A1 | 1/2007 | Katz et al. |
| 2007/0061860 | A1 | 3/2007 | Walker et al. |
| 2007/0124769 | A1 | 5/2007 | Casey et al. |
| 2009/0029644 | A1 | 1/2009 | Sue et al. |
| 2009/0031383 | A1 | 1/2009 | Margaritis |
| 2009/0055863 | A1 | 2/2009 | Savoor et al. |
| 2009/0116379 | A1 | 5/2009 | Rahman |
| 2009/0178089 | A1 | 7/2009 | Picco et al. |
| 2009/0199200 | A1 | 8/2009 | Arimilli et al. |
| 2009/0217327 | A1* | 8/2009 | Nagano ............ H04N 7/17336 725/87 |
| 2009/0271512 | A1 | 10/2009 | Jorgensen |
| 2010/0319048 | A1 | 12/2010 | Ahmed et al. |
| 2011/0154420 | A1 | 6/2011 | Korte et al. |

FOREIGN PATENT DOCUMENTS

| | | |
|---|---|---|
| JP | 2002073541 | 3/2002 |
| JP | 2002223425 | 8/2002 |
| JP | 2002344557 | 11/2002 |
| JP | 2003169087 | 6/2003 |
| JP | 2005167702 | 6/2005 |
| JP | 2006050479 | 2/2006 |

OTHER PUBLICATIONS

Extended European Search Report, dated Jun. 2, 2014, Application No. 10842422.7, filed Nov. 18, 2010; 9 pgs.
International Preliminary Report on Patentability, dated Jun. 28, 2012, Int'l Appl. No. PCT/US10/057191, Int'l Filing Date Nov. 18, 2012, 6 pgs.
Japan Examination Report, dated Oct. 1, 2013, Application No. 2012-544538, filed Nov. 18, 2010; 4 pgs.
Japan Examination Report, dated Oct. 14, 2015, Application No. 2012-544538, filed Nov. 18, 2010; 4 pgs.
Japanese Decision of Rejection, dated Mar. 31, 2015, Application No. 2012-544538, filed Nov. 18, 2010; 2 pgs.
Japanese Decision to Dismiss Amendment, dated Mar. 31, 2015, Application No. 2012-544538, filed Nov. 18, 2010; 3 pgs.
Japanese Examination Report, dated Jul. 1, 2014, Application No. 2012-544538, filed Nov. 18, 2010; 4 pgs.
Japanese Notice of Reasons for Rejection, dated May 10, 2016, Application No. 2012-544538, filed Nov. 18, 2010; 4 pgs.
Mexican Examination Report, dated Aug. 22, 2013, Application No. MX/a/2012/006888, filed Nov. 18, 2010; 2 pgs.
Mexican Examination Report, dated Feb. 20, 2014, Application No. MX/a/2012/006888, filed Nov. 18, 2010; 3 pgs.
Search Report and Written Opinion, dated Mar. 2, 2011, WIPO, in PCT Appln. No. PCT/US2010/057191 , 7 pgs.
Korean Examination Report dated Oct. 21, 2016, Application No. 2012-7015514, filed Nov. 18, 2010; 13 pgs.
Canadian Examination Report, dated Oct. 12, 2016, Application No. 2,784,392, filed Nov. 18, 2010; 3 pgs.
European Examination Report, dated Jul. 12, 2017, Application No. 10842422.7, filed Nov. 18, 2010; 4 pgs.
Canadian Examination Report, dated Sep. 20, 2017, Application No. 2,784,392, filed Nov. 18, 2010; 2 pgs.

* cited by examiner

FIG. 7

| RESERVATION SYSTEM | | | | | — ☐ ✕ |
|---|---|---|---|---|---|
| HOME | RESERVATIONS | TOOLS | LOG OUT | | |
| ORDER DETAIL | FROM/TO | SEARCH | RESERVATION STATUS ⌐802 | | |

CONFIRMATION NUMBER: 2722557

| | | | | |
|---|---|---|---|---|
| CUSTOMER: | VYVX | CONTACT: | JOHN DOE | |
| NAME: | 5MEG TO HQ | PHONE: | 555-555-1234 | FAX: 555-555-4321 |
| P.O.#: | 198-912 | SERVICE: | P-TO-P ONE WAY | BANDWIDTH: 5MBPS |
| START DATE: | 03/05/09 8:00 | PRODUCT: | VIDEO FEED | |
| END DATE: | 03/05/09 12:00 | EVENT: | ASI OCCASIONAL | ⌐902 |

ORIGIN VYVX MVNS BSTNMA     NEWTON, MA

LOCAL ACCESS: VYVX TX#2    VYVX CPE-1 DCM1C1P2    270 MB    ASI    EMBEDDED AUDIOS    VYVX MVNS BSTNMA

DESTINATION CORE NETWORK PUBLISHING POINT

<u>SHOW CHARGES</u> ↙  <u>HIDE CHARGES</u>

RESERVATION SYSTEM

| HOME | RESERVATIONS | TOOLS | LOG OUT |

| ORDER DETAIL | FROM/TO | SEARCH ⌐1002 |

FROM DATE  [03/05/09] ⌐1004
TO DATE    [03/05/10] ⌐1006
RESERVATION ID     [ALL] ⌐1008
RESERVATION STATUS [ALL ▸] ⌐1010
SITE               [ALL ▸] ⌐1012
COMPANIES          FNC      ⌐1014
                   KDFW-TV
                   KDVR
                   ◂ ≡ ▸

[SUBMIT] ⌐1016    [RESET] ⌐1018

FIG. 11

RESERVATION SYSTEM

| HOME | RESERVATIONS | TOOLS | LOG OUT |

| ORDER DETAIL | FROM/TO | SEARCH |

SEARCH RESULTS

| CUST ABBR | RES ID | RES NAME | STATUS | START TIME | END TIME | ORIGIN | |
|---|---|---|---|---|---|---|---|
| VYVX | 2722556 | 5 MEG TO HQ | CONFIRMED | 03/05/09 8:00 | 03/05/09 12:00 | NEWTON, MA | DESTINATION |
| VYVX | 2722559 | 8 MEG TO HQ | CONFIRMED | 03/05/09 8:00 | 03/05/09 12:00 | NEWTON, MA | DESTINATION |
| VYVX | 2723159 | 8 MEG TO HQ-PTP | CONFIRMED | 03/05/09 8:00 | 03/05/09 12:00 | NEWTON, MA | DESTINATION |
| VYVX | 2723385 | TEST | CONFIRMED | 03/05/09 8:00 | 03/05/09 12:00 | LAKE MARY, FL | DESTINATION |
| VYVX | 2723698 | TRAIN 10M TO HQ | CONFIRMED | 03/05/09 8:00 | 03/05/09 12:00 | NEWTON, MA | DESTINATION |
| VYVX | 2723715 | TRAIN WEEKLY UP... | CONFIRMED | 03/05/09 8:00 | 03/05/09 12:00 | NEWTON, MA | DESTINATION SUBSCRIBE |
| VYVX | 2724011 | TRAIN TUES UPDA... | CONFIRMED | 03/05/09 8:00 | 03/05/09 12:00 | NEWTON, MA | DESTINATION SUBSCRIBE |
| VYVX | 2724112 | TRAIN INQUIRY | CONFIRMED | 03/05/09 8:00 | 03/05/09 12:00 | NEWTON, MA | DESTINATION SUBSCRIBE |

<< BACK

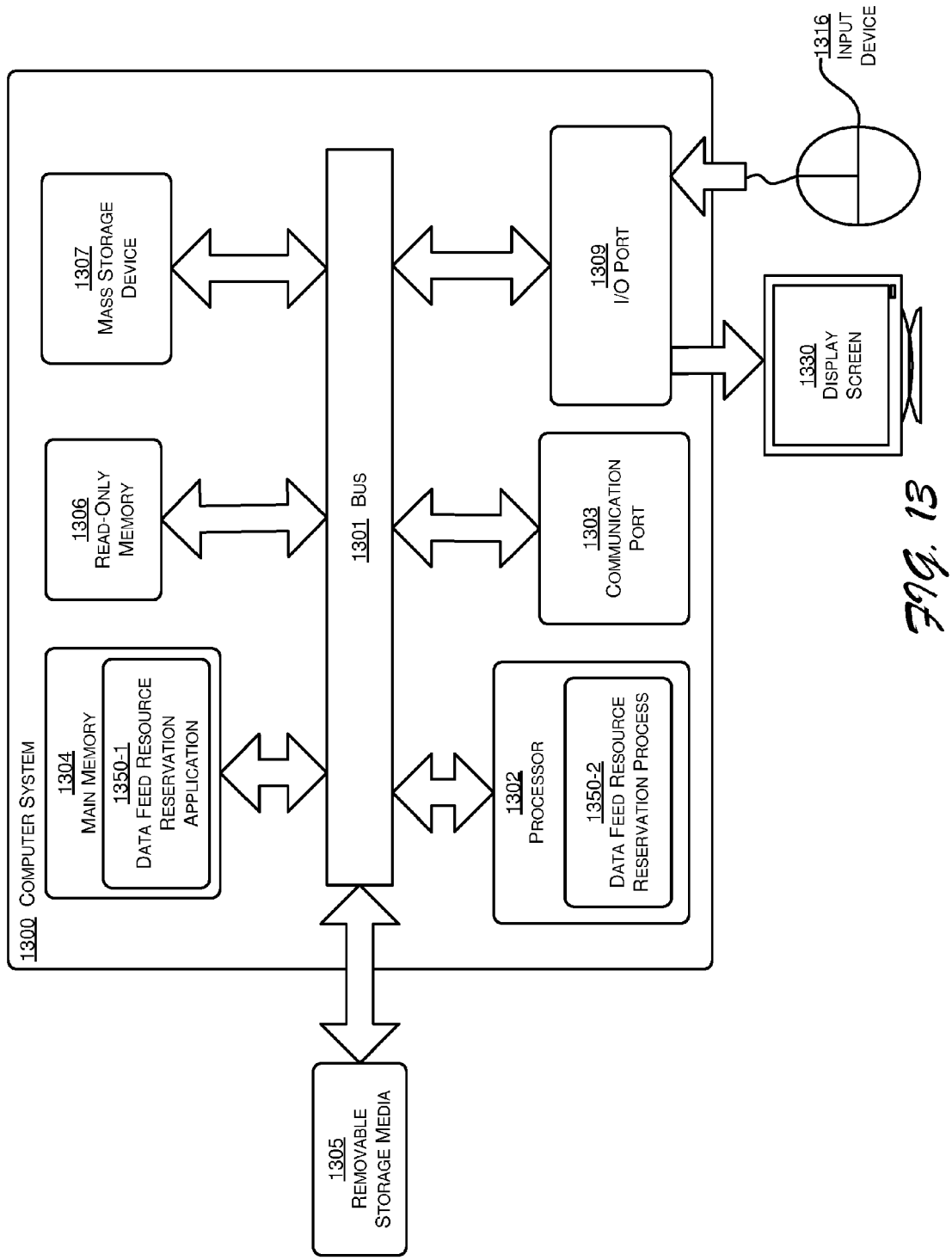

DATA FEED RESOURCE RESERVATION SYSTEM

CROSS-REFERENCE TO RELATED APPLICATIONS

This application is a continuation of and claims the benefit of priority to U.S. application Ser. No. 12/640,287, titled "DATA FEED RESOURCE RESERVATION SYSTEM," filed Dec. 17, 2009, the contents of which are incorporated by reference herein for all purposes.

TECHNICAL FIELD

Embodiments presently disclosed generally relate to delivery of video feeds. More specifically, embodiments herein relate to delivery of video feeds using a subscription service.

BACKGROUND

Television content and other data is often distributed over terrestrial networks, such as the Internet. Television broadcasters, for example, may transmit video feeds over a network of an Internet service provider (e.g., a wholesale network service provider). Video feeds (e.g., television programs) are often distributed to different local markets by transmitting the video feeds between locally based broadcaster stations, which may be affiliates of each other in different metropolitan markets. In this manner, for example, a television program from a FOX™ television station in one city could be made available to stations in other cities via the Internet. Unfortunately, conventional systems for distributing video (or other data) feeds over terrestrial networks have various shortcomings.

In a typical arrangement, a television distributor's site is interconnected with an Internet service provider network at an interconnection point. Through the interconnection point, video feeds can be transmitted and received by the distributor via the service provider network. Conventionally, an interconnection point includes individual video loops for each of the transmitted and received video services, as well as separate channels for data services. This arrangement has resulted in a number of drawbacks and limitations related to the manner in which data and video feeds are distributed over terrestrial networks.

One problem relates to lack of scalability of conventional systems. The use of individual video loops and data channels at distributors' sites has prevented distributors from taking advantage of economies of scale that could otherwise exist. In this regard, addition of a new video service over the Internet, for example, often cannot take advantage of already existing infrastructure or systems, due to the inflexible infrastructures at distributors' sites. For example, in conventional systems, if a video distributor wants to provide another video service, another separate video channel typically must be installed at the distributor's site.

In addition, conventional systems have been characterized by inefficient use of bandwidth. For example, often a high rate data channel, such as a full 270 Megabit/sec (Mbps) data rate channel, is used to transmit low bit rate data such as Asynchronous Serial Interface (ASI) traffic. In addition, for each additional destination that receives a data feed from a single source, the outgoing bandwidth consumed from the source increases. For example, sending a 20 Megabit/sec video feed to 20 destinations requires the customer to have at least a 400 Megabit/sec or faster connection. This inefficient use of bandwidth is related to the lack of scalability of conventional systems—conventional systems cannot rapidly adapt to changes in network bandwidth conditions to thereby use existing bandwidth in an efficient manner. As such, growth in, and use of, video services over terrestrial networks, such as the Internet, have been inefficient, limited, cumbersome and inflexible.

It is with regard to the foregoing problems and other problems that embodiments of the present invention have been developed.

SUMMARY

Embodiments presently disclosed generally relate to data feed resource reservation systems and methods. Further, embodiments include systems and methods for time-based routing of data over a terrestrial network using a resource reservation scheme. A reservation system is provided through which resources can be reserved for the distribution and receipt of data feeds such as video feeds. The reservation system includes an interface for receiving reservation parameters and a scheduling system for scheduling available resources to deliver and receive data feeds. Accordingly, resources, such as bandwidth, are reserved for delivering data feeds prior to actual data feed delivery, based on a time-based scheduling scheme.

In at least one embodiment, a video feed can be scheduled for publication within a time frame. An entity, such as, but not limited to, a local broadcaster, may subscribe to the video feed by submitting a subscription request. One or more destinations may be specified in the subscription request. A different delivery time may be specified, respectively, for one or more of the destinations. A scheduling system receives the subscription request and determines if sufficient resources are available to deliver the video feed to the one or more destinations at the respective delivery times. Prior to the specified delivery time(s), available resources are scheduled (e.g., reserved) for delivery of the video feed at the specified delivery time(s). The scheduled resources are configured for video feed delivery and released after the delivery time(s).

An embodiment of a method of managing delivery of a video feed over a terrestrial network includes receiving a subscription request specifying one or more destination sites to receive the video feed and respective times at which to deliver the video feed to each of the one or more destination sites, wherein respective delivery times are within a publication time range in which the video feed will be available. The method further includes configuring available resources to deliver the requested video feed to the one or more destination sites at the respective times. Further still, the method may include receiving a publication request specifying the publication time range.

An embodiment of the method may further include identifying one or more available resources that are available at the respective delivery times. Configuring available resources may include reserving one or more ports of a replicator to deliver the requested video feed at the respective delivery times. The method may further include determining whether there is sufficient bandwidth on one or more ports of a video feed delivery device to deliver the requested video feed at each of the one or more delivery times. The method may further include sending a rejection message if there is insufficient bandwidth available to deliver the requested video feed at a requested delivery time. Still further, the method may include sending a reservation confirmation message confirming that resources are available to deliver the requested video feed if sufficient bandwidth is available.

An embodiment of a method may further include de-allocating the available resources after delivery of the requested video feed. Configuring available resources may include determining if resources are available to deliver the requested video feed at each of the one or more delivery times, and if resources are not available to deliver the requested video feed to one of the one or more destination sites, and resources are available to deliver the video feed to the other one or more destination sites, configuring only the available resources to deliver the video feed to the other destination sites at the respective delivery times.

An embodiment of a system for managing delivery of video feeds over a terrestrial network includes a resource scheduler operable to reserve available resources at one or more requested times for delivering a video feed to respective one or more requested destinations and a configuration module operable to configure the available resources for delivering the video feed to one or more destinations at the respective times at which resources are available. The resource scheduler may be further operable to release available resources after the one or more requested delivery times. The resource scheduler may be further operable to receive a publication request specifying a publication time window in which the video feed will be available for delivery.

Still further, the resource may be operable to receive a subscription request specifying one or more requested delivery times and respective one or more destinations. The resource scheduler may be further operable to determine whether each of the one or more requested delivery times are within the publication time window. Still further, the resource scheduler may be operable to determine whether sufficient resources are available at an origination location and each of the one or more destinations at the respective delivery times. Further still, the resource scheduler may be operable to choose a destination location from among a plurality of destination locations to which the video feed can be delivered.

Further yet, the resource scheduler may choose the destination location based on zones of locations. The resource scheduler may further provide an online interface for subscribing to video feeds to be published. The online interface may present video feeds that will be published. The online interface may be configured to receive subscriptions to one or more selected video feeds.

An embodiment of a computer implemented method for managing delivery of a data feed over a terrestrial network includes receiving a publication request specifying a publication time frame within which the data feed will be available for publication, receiving a subscription request to subscribe to the data feed, the subscription request specifying a destination to receive the data feed and an associated delivery time to deliver the data feed at the destination, reserving available bandwidth at the specified delivery time if the specified delivery time is within the publication time frame, and denying the subscription request if the specified delivery time is outside the publication time.

An embodiment of a computer program product may include one or more computer-readable media. The computer-readable media may have computer executable instructions encoded thereon. The computer executable instructions may be executed by a general purpose or specific purpose computer to carry out processes described herein. Computer-readable media may comprise storage media.

BRIEF DESCRIPTION OF THE DRAWINGS

FIG. 7 illustrates an example user interface for entering subscription and/or publication request parameters according to an embodiment.

FIG. 9 illustrates an example user interface presenting reservation request confirmation details according to an embodiment.

FIG. 10 illustrates an example user interface for searching for scheduled data feed publications, which may be subscribed to according to an embodiment.

FIG. 11 illustrates an example user interface presenting scheduled data feed publications in response to the search requested through the user interface of FIG. 10 according to an embodiment.

FIG. 13 is an example block diagram of a computer system configured with a data feed resource scheduling application and process according to embodiments herein.

DETAILED DESCRIPTION

Figure 1:
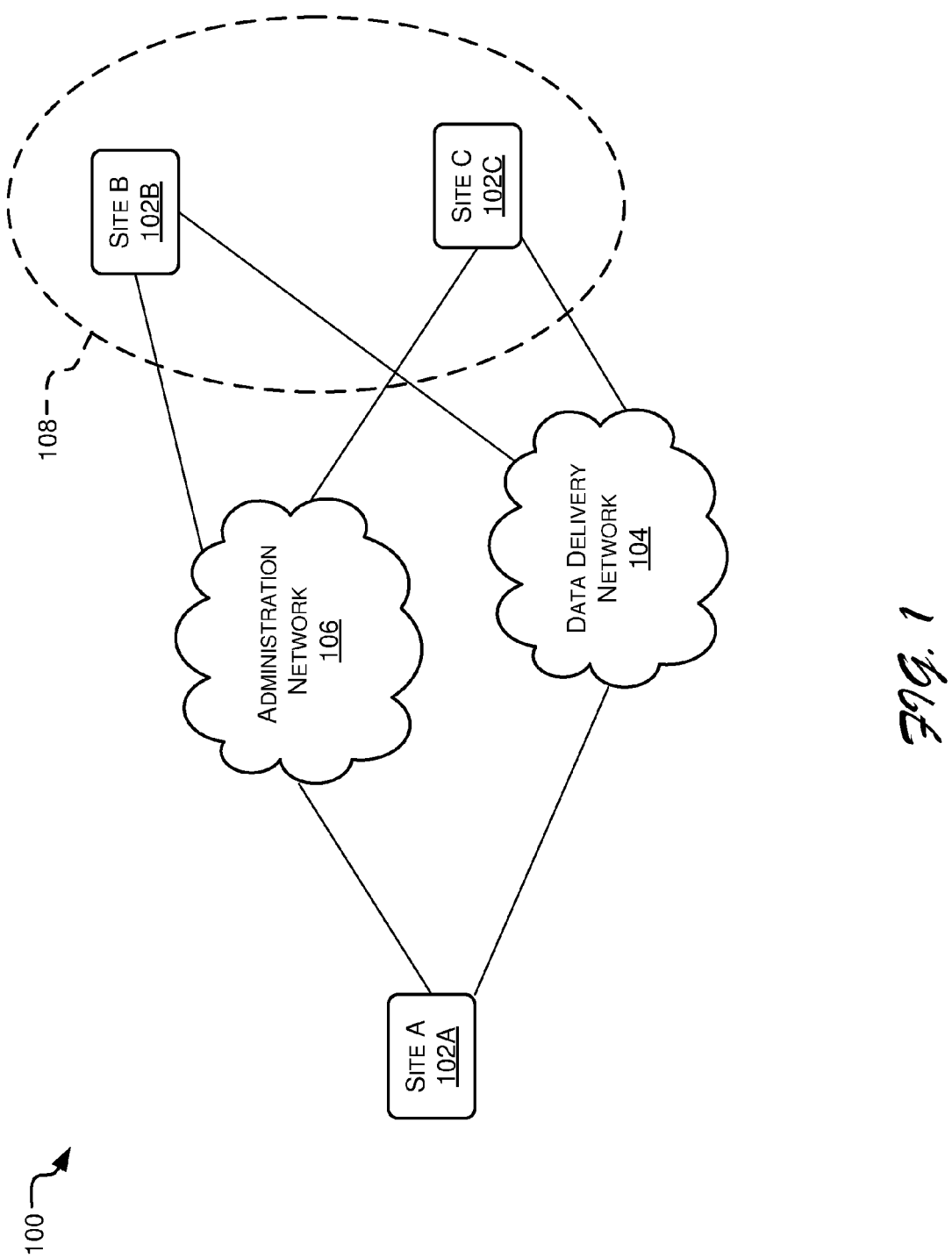
FIG. 1 illustrates an example network environment suitable for carrying out data feed resource reservation according to an embodiment.

Embodiments presently disclosed generally relate to scheduling delivery of data over a terrestrial network. More specifically, embodiments herein relate to time-based routing of video feeds. A video feed can be scheduled for publication within a time frame. An entity, such as, but not limited to, a local broadcaster, may subscribe to the video feed by submitting a subscription request. One or more destinations may be specified in the subscription request. A different delivery time may be specified, respectively, for one or more of the destinations. An embodiment of a system receives the subscription request and determines if sufficient resources are available to deliver the video feed to the one or more destinations at the respective delivery times.

One or more embodiments include systems and methods for time-based allocation of resources, such as circuit bandwidth, to one or more data types that can be communicated over a terrestrial network. A circuit can include one or more ports, and typically includes multiple ports. Each port provides a certain amount of bandwidth, which can be allocated to the various data types. Data types can include data services, video feeds, management data and others. A system can allocate bandwidth to a video feed at a specified time in the future on a particular circuit. In an embodiment, data services are adjusted (e.g., reduced) on the particular circuit based on quality of service (QOS) settings in the network devices. In these or other embodiments, management data is transmitted across different circuits on a management network.

In some embodiments, allocation of bandwidth can involve reserving a port on the circuit at a specified time. The system further keeps track of how much bandwidth has been reserved for each port. When a maximum amount of bandwidth has been reserved on a port at a given time, no more bandwidth can be allocated on that port at that time. Available bandwidth can be allocated to various data types until the maximum amount of bandwidth is reached. In this manner, use of limited bandwidth on circuits can be adapted prior to delivery of data in order to efficiently use the bandwidth. In one embodiment, unallocated bandwidth will be used by the data service and if there isn't any available bandwidth, then data service traffic is suspended until bandwidth becomes available again.

Various embodiments relate to creating a community of interest within which video or other data feeds can be shared among members of the community of interest. Members may be related to each other in some way, such as, but not limited to, as affiliates of a larger organization. Alternatively, or in addition, members may include one or more entities that are not affiliates of a larger organization. In cases where the community of interest includes affiliates, data feeds may be shared via one or more private ports of data delivery devices of the affiliates. In cases where the community of interest includes non-affiliates, data feeds may be shared via one or more public ports of the members of the community of interest.

An embodiment includes a system operable to perform time-based routing of video or other data feeds over a terrestrial network. In these embodiments, a publication request may be received that specifies a time window within which a video feed will be published in the future. An embodiment of the system maintains a schedule of video feeds to be published. Entities, who may or may not be members of a community of interest, can subscribe to the video feeds. An entity can submit a subscription request which requests that a video feed be delivered to one or more destinations at one or more respective times. The system may validate the subscription request by, for example, checking whether the one or more respective times are within the time window specified by the publication request.

In an embodiment, the system further checks that sufficient resources, such as bandwidth, are available at the respective times at the video feed origin and the one or more destinations. The check for sufficient resources may involve determining whether sufficient bandwidth is available at an origin (e.g., an origination circuit) to transmit the video feed within the specified publication time. For example, the system may determine if a port is available at the origin at the specified time, which can provide sufficient bandwidth to deliver the requested video feed. If sufficient resources are not available, a notification is generated that indicates that the resources could not be reserved. If sufficient resources are available, available resources are reserved.

In various embodiments, available resources are reserved for publication and delivery of video feeds at specified subscription times. Resources include, but are not limited to, bandwidth, ports, circuits, channels and/or other resources that are used to deliver a video feed from an origin to a destination. Reservation of resources can involve configuring one or more video feed delivery devices to deliver and/or receive a scheduled video feed at a given time. Configuring resources may involve making the resources operational to perform a given function. For example, one or more ports on a core replicator device may be reserved to transmit the scheduled video feed at the given time. After the video feed(s) is/are delivered at the specified time(s), the reserved resources are released. Releasing resources involves making the resources available for use in other video feed deliveries. Once released, the resources may be reserved for other publications and subscriptions.

An embodiment of a system provides a user interface through which publication requests and subscription requests can be submitted. The user interface may be web-based. In a web-based embodiment, users may access the interface via a public network, such as the Internet, or private network, such as an intranet or virtual private network. Users who may access the interface may be members of a community of interest.

In at least one embodiment, through a user interface a user can specify an origin of a video feed, from which the video feed will be published. The user may also specify one or more destinations to which the video feed is desired for delivery. The origin and destinations may be specified by location (e.g., city and state) and/or circuit (e.g., circuit identifier(s)). In one embodiment, if no destinations are specified, the request is considered to be a publication request. A publication request is a request for resources for publishing a video feed from a specified origin at a specified time.

According to one or more embodiments, a system can deliver a video feed to a single destination or multiple destinations. In the case of multiple destinations, the video feed may be transmitted multiple times over multiple channels to the multiple destinations. The multiple transmissions of the video feed may be at one or more different times or the same time. Transmission of the video feed to multiple destinations may be carried out using replication. Replication involves regenerating a published video feed on one or more channels to multiple destinations.

In one embodiment, replication of a published data feed allows for simultaneous delivery of multiple data feeds. For example, a single data feed may be simultaneously reproduced on multiple separate channels to multiple respective destinations. Replication may be carried out at one or more locations relative to a data feed delivery network, including, but not limited to, in a core of the network, on an edge of the network and/or at a data feed distributor's premises. Delivery of multiple data feeds can involve simultaneous (e.g., in parallel) delivery of two or more of the data feeds and/or sequential (e.g., serial) delivery of the data feeds.

FIG. 1 illustrates an example network environment 100 suitable for time-based routing of data feeds through a terrestrial network according to at least one embodiment. The network environment includes one or more sites 102 that can generate (e.g., publish) and/or receive data feeds from other sites 102. The data feeds are transmitted, at least in part, over a terrestrial data delivery network 104. In at least one embodiment, data delivery network 104 is an infrastructure of routers (not shown), data channels (e.g., fiber), and/or other network devices, that form a packet based communication network. In one embodiment, the communication network 104 is an Internet protocol (IP) network that uses a multiprotocol label switching (MPLS) protocol.

Sites 102 are locations between which data, such as, but not limited to, video feeds, can be communicated. For example, a site 102 may be a local network broadcasting station. The sites 102 are typically geographically distributed. For example, site 102A may be located in Los Angeles and site 102B may be located in New York. As such, the terrestrial network 104 typically spans a geographic area that includes multiple locations of the various sites 102. Although only three sites 102 are shown in FIG. 1, it will be understood by those of skill in the art that numerous other sites may communicate via the network 104 in actual operation.

The sites 102 include resources for producing and handling various types of data. For example, in the case of video, a site 102A may have video capture equipment, such as video cameras (not shown). Sites 102 also include data delivery and reception equipment configured to transmit and receive data, respectively, from other sites 102. In various embodiments, such as the embodiment shown in FIG. 2, the data delivery and reception equipment at each site 102 includes a network adapter unit operable to format data for delivery over the terrestrial network 104. Of course the resources available at each site 102 to deliver and receive data are not unlimited. For example, each site 102 is typically limited to a maximum bandwidth for transmitting data at any given time.

As discussed, sites 102 may generate (e.g., publish) data feeds, such as, but not limited to, video feeds. A data feed is generally an identifiable set of one or more units of related data having a beginning and an end. Other sites 102 may wish to subscribe (described further below) to published data feeds to thereby receive the published data feeds at a selected destination site or sites. Due in part to limited resources at each site 102, a resource reservation scheme is employed to manage use of limited resources. In one embodiment of the reservation scheme, resources are reserved in advance to carry out the delivery of data feeds across the terrestrial network 104 at specified times. As such, the reservation scheme provides for time-based routing of data feeds over the terrestrial network 104.

In one embodiment, an administrative network 106 is provided which supports resource scheduling. The administrative network 106 may be a public or private network. For example, in one embodiment the administrative network 106 is the public Internet. In another embodiment, the administrative network 106 is a private intranet. In yet another embodiment, the administrative network 106 is a virtual private network. The administrative network 106 provides an infrastructure for reserving resources for routing of data feeds in a time-based fashion.

In one embodiment, the administrative network 106 includes one or more web servers or other server computers, which provide a user interface and maintain a schedule of resource reservations. Users at sites 102 can log into the web server and request resources for publication of a specified data feed, as well as subscribe to a published data feed. Subscribing to a published data feed refers to requesting delivery of the published data feed at one or more specified destinations at one or more respective specified times. The administrative network 106 server computers determine if resources are available at the associated sites and reserves available resources, if any. In this manner the administrative network 106 servers manage the use of resources, such as bandwidth, to carry out time-based routing of the data feeds.

With further regard to sites 102, in some embodiments, each site 102 can be included in one or more communities of interest. Members (or associates) of a community of interest can share data feeds between each other. Members of a community of interest may or may not be affiliates of a larger organization. For example, in a given community of interest all the members may be FOX™ affiliates of the FOX™ corporation. In another case, some of the members may be affiliates of a larger organization, while other members may not be affiliates of the larger organization. For example, the community of interest may include multiple FOX™ affiliates and an ESPN™ site and a CNN™ site.

In some embodiments, sites 102 can be included in defined zones, such as zone 108. The zones may be a logical, geographic or other relationship between sites 102. For example, some sites 102 that are located in the western United States may be in a Western zone. Similarly, other zones could be a Central zone, an Eastern zone, a Southern zone, a Northeastern zone and/or a Midwestern zone. Zones 108 may be useful for determining a preferred publishing point for a data feed. For example, a data feed to be delivered to a site 102 in a Western zone may be published from one of the Western sites 102. The zones 108 may be prioritized, whereby a more proximate zone has a higher priority than other zones. Other logical prioritization schemes may be employed.

Figure 3:
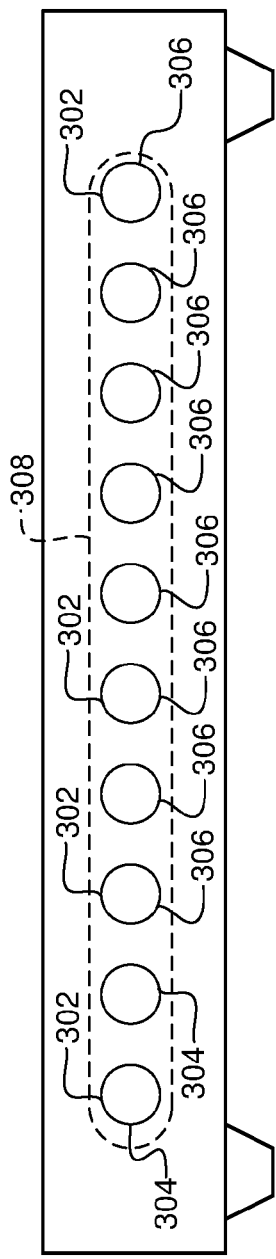
FIG. 3 illustrates ports of a network adapter unit, which is operable to transmit and receive data feeds.

As discussed further below, each site 102 includes one or more data delivery devices, such as a network adapter unit, discussed further below. FIG. 3 is discussed here for ease of discussion. Each data delivery device 212 includes a number of ports 302, such as are shown in FIG. 3. The ports 302 can be designated as public or private. Private ports 304 can be used by sites that are members of the same community of interest, and public ports 306 can be used by any sites. For example, a FOX™ affiliate site may have two private ports 304 and eight public ports 306. In this example, other members of the FOX™ community of interest may subscribe (subscribing is described below) to a data feed on one of the private ports 304 of the FOX™ affiliate, while another site such as a CNN™ site, may subscribe to a data feed from one of the public ports 306 of the FOX™ affiliate.

Figure 2:
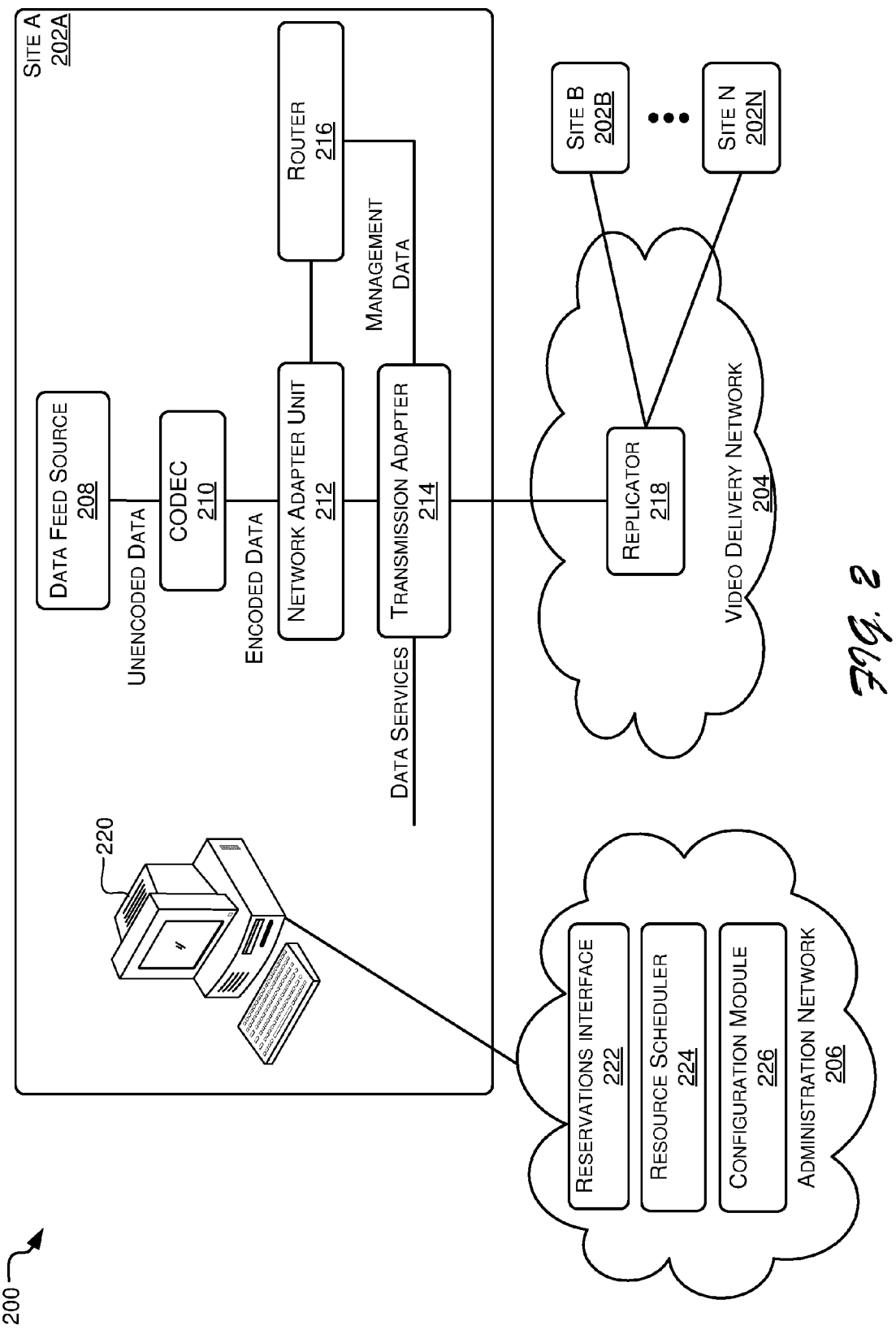
FIG. 2 illustrates an example network environment suitable for carrying out data feed resource reservation and data feed delivery over a terrestrial network according to the embodiment of FIG. 1.

FIG. 2 illustrates a network environment 200 showing network components that can be used to provide a data feed resource reservation and managed delivery service according to the embodiment of FIG. 1. In FIG. 2, component details of one of the sites, site 202A, are shown according to a particular embodiment. Other sites, such as 202B through 202N, typically included similar components as those shown in site 202A. In general, site 202A is in operable communication with components of a video delivery network 204 and an administrative network 206.

In the illustrated embodiment, a coder/decoder (CODEC) 210 at site 202A is operable to receive unencoded data from a data feed source 208 (e.g., a video camera, a data feed repository and/or others). Unencoded data may be video data that comprises a video feed. CODEC 210 encodes the data into an encoded format. An example of a CODEC 210 is a Motion Picture Experts Group (MPEG) video encoder/decoder, but the CODEC 210 is not limited to an MPEG codec. In one embodiment the CODEC 210 receives uncompressed data and compresses the data into an Asynchronous Serial Interface (ASI) format. In the illustrated embodiment a network adapter unit (NAU) 212 receives encoded video data and formats the data into Gigabit Ethernet (Gig-E) format.

In some embodiments, depending on the protocol and format used by the video delivery network 204, one or more transmission adapters 214 are included to format the Gig-E signal from the NAU 212 for transmission over the video delivery network 204. In one embodiment, the transmission adapter 214 converts or formats the Gig-E signal from the NAU 212 into one or more of a digital signal 3 (DS3), optical carrier 3 (OC3) or OC12 format, which can be communicated over the video delivery network 204. One or more embodiments also support OC-48 or OC-192, as well as Ethernet at 10 Megabits/sec (Mbps), 20 Mbps, 30 Mbps, 40 Mbps, 50 Mbps, 100 Mbps, 200 Mbps, 300 Mbps, 400 Mbps, 500 Mbps, 600 Mbps and 1 Gigabit/sec (Gbps).

Other data services are not data feeds, but are carried over the network. Such data services may supplement data feeds, such as video feeds. Examples of data services include, but are not limited to, electronic programming guide data, closed captioning, or other services. Such other data services may be introduced through the transmission adapter 214. Such data services may be included in data feeds transmitted by the transmission adapter 214. A transmission adapter 214 is not necessary in embodiments where the Gig-E signal from the NAU 212 can be communicated directly over the video delivery network 204 without any additional formatting or conversion.

In at least one embodiment, the NAU 212 has multiple ports for communicating data. In one embodiment, the number of ports is ten. FIG. 3 is discussed here again to further illustrate the use of ports on the NAU 212. FIG. 3 is an elevation view of an example NAU 212 according to a particular embodiment. The NAU 212 includes ten physical ports 302. Each port can handle or provide a maximum bandwidth. In other words, there is limited bandwidth available through the NAU 212 at any given time. All of the ports 302 form a circuit 308. The bandwidth of the circuit 308 is the sum of the bandwidth of all the ports 302.

The physical ports 302 may include one or more private ports 304 and one or more public ports 306. Private ports 304 can be subscribed to by other sites 202 that are members of a community of interest. Public ports 306 can be subscribed to by other sites 202 that are not members of the same community of interest.

Continuing again with the embodiment shown in FIG. 2, a router 216 of site 202A is communicably coupled to the NAU 212 and the transmission adapter 214. The router 216 provides management data to the transmission adapter 214. Management data from the router 216 may be incorporated into signals that are transmitted over the video delivery network 204 by the transmission adapter.

The video delivery network 204 includes a replicator 218. The replicator includes numerous ports and is in communication with numerous sites 202. The replicator is operable to receive a data feed from transmission adapter 214 and retransmit the data feed to one or more other sites 202B, 202N. The replicator 218 is configurable (e.g., by a configuration module, discussed further below) to route data feeds to selected sites at specified times. The replicator 218 may reproduce data feeds in a serial or parallel manner. For example, the replicator 218 can reproduce multiple data feeds simultaneously (e.g., parallel) to different destination sites and/or the replicator 218 can reproduce multiple data feeds one after the other (e.g., serially), or a combination of serial and parallel. For example, in a serial subscription scenario, the publication may be a 30 minute publication. In this scenario a first subscription may run for 10 minutes, followed by another subscription for 15 minutes.

In an embodiment, site 202A further includes a computer 220 that is in operable communication with a reservations interface 222 of the administration network 206. The computer 220 can have stored in memory an executable browser application, with which a user can navigate to one or more web-based reservation interfaces 222 provided by a web server of the administration network 206. Through the interface 222, the user can submit publication requests and subscription requests and the user can be notified as to whether or not the requests are fulfilled.

A resource scheduler 224 receives request data from the reservations interface and attempts to find available resources among the devices at sites 202 and the terrestrial network 204, with which to fulfill the requests. The resource scheduler 224 can reserve available resources to deliver the data feed that is the subject of the publication or subscription request. Further, the scheduler can adapt the use of available bandwidth to achieve an efficient use of bandwidth for delivery of video feeds. By identifying available resources for carrying the associated data feed at specified time(s), the scheduler performs time-based routing of the data feed.

The resource scheduler 224 is further operable to release resources after they have been used to fulfill a publication or subscription request. Releasing resources may involve de-allocating the resources. For example, de-allocating the resources may involve marking resource identifiers in memory in such a way as to indicate the resources are no longer allocated to the previous data feed delivery event, and that the resources are available for use. An example embodiment of a resource scheduler is shown in FIG. 4 and discussed in detail below.

If sufficient resources are determined to be available to satisfy a request, a configuration module 226 configures the available resources according to the schedule. The configuration module 226 is in communication with devices (e.g., NAU 210 and replicator 218) at the sites 202 and the terrestrial network 204 in order to configure them. The configuration module 226 may also be operable to deconfigure or reconfigure the devices after the delivery of each scheduled video feed. FIG. 4 illustrates example modules according to one embodiment of a data feed resource reservation system.

Figure 4:
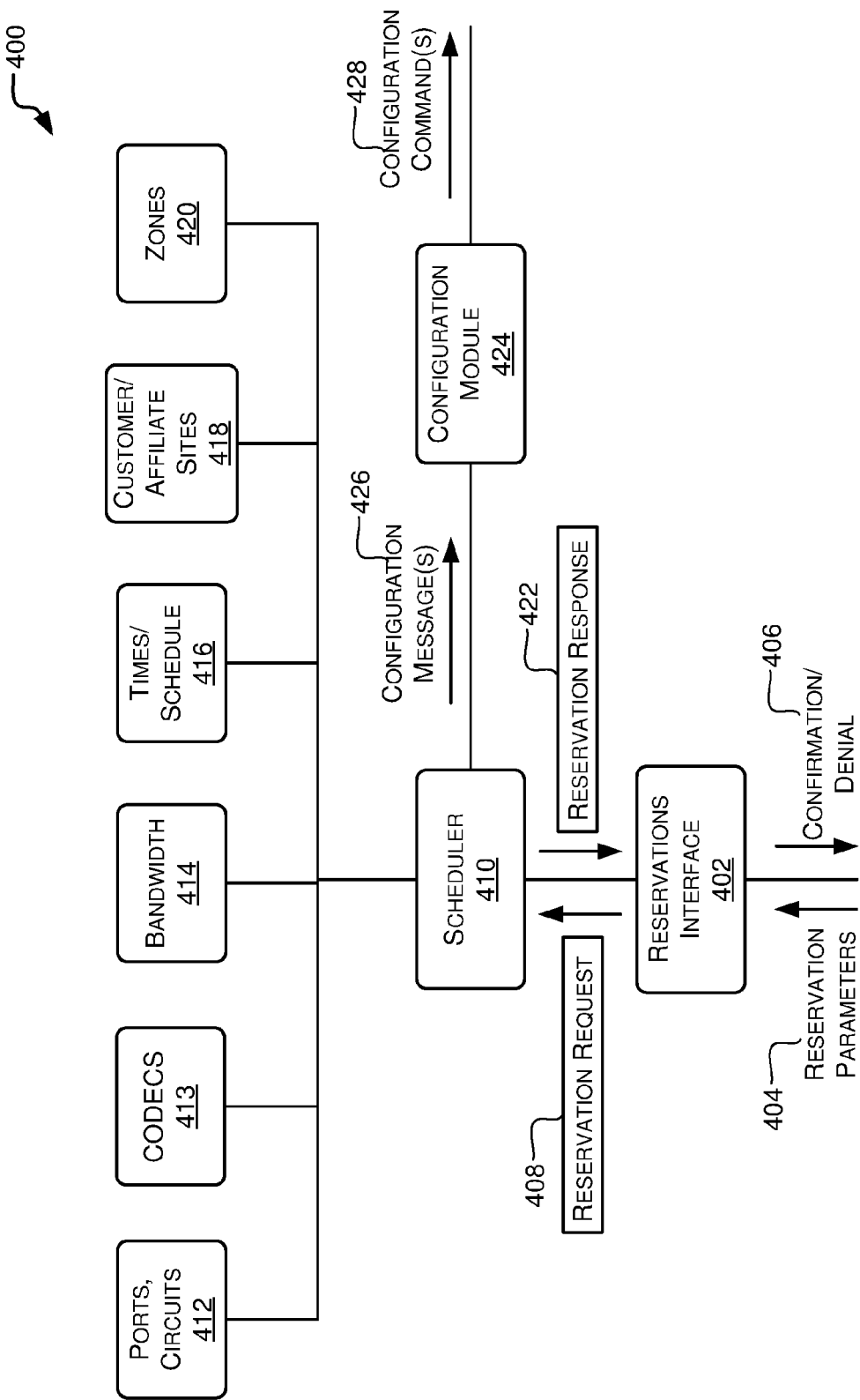
FIG. 4 illustrates an example system for carrying out data feed resource reservation according to an embodiment.

FIG. 4 is a module diagram illustrating an example system 400 for carrying out data feed resource reservation in accordance with an embodiment. The data feed resource reservation system 400 may be incorporated in an administrative network, such as administrative network 206 (FIG. 2) or other architecture. In general, the data feed resource reservation system 400 is operable to receive subscription and publication request parameters and, based on the parameters, schedule available resources for delivery of the data feed.

In general, a reservations interface 402 receives request parameters 404 and outputs reservation status notifications 406. In one embodiment, the reservations interface 402 is a user interface that a user can access through a computer. For example, the reservations interface 402 can be a web-based interface accessible by users through a network. In one embodiment the reservations interface 402 presents one or more user screens through which parameters can be entered and data can be displayed. Example user interface screens are shown in FIGS. 6-11, which are described in detail further below.

In another embodiment, the reservations interface 402 is an application interface program through which other computer programs or processes can enter reservation parameters 404. In this embodiment, parameters may be obtained from another source, such as a user interface or a repository of parameters that is separate from the system 400.

In one embodiment, reservation parameters 404 can include but are not limited to user identification, customer identification, zone, circuit identifier(s), bandwidth or time specifications. The reservation parameters are used by the reservations interface 402 to form a reservation request 408, which may be a publication request or a subscription request. An embodiment of a reservation request 408 is shown in FIG. 5.

Figure 5:
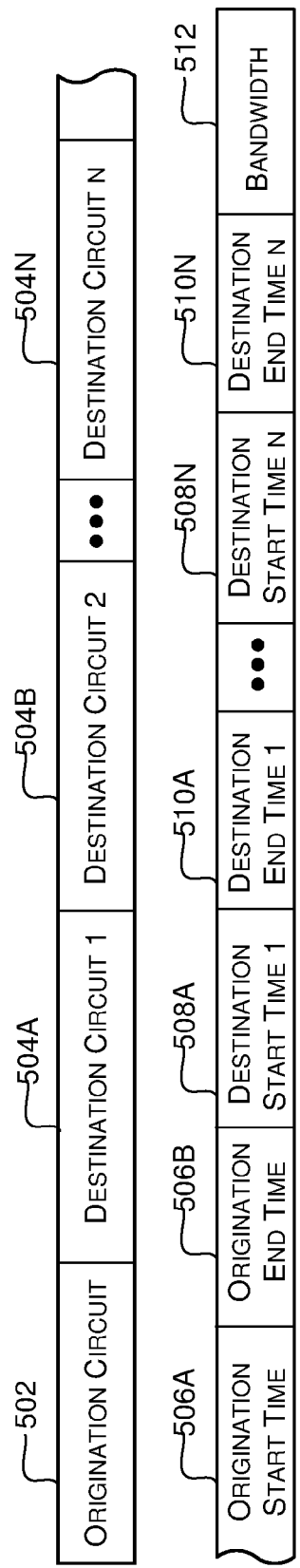
FIG. 5 illustrates an example subscription or publication request according to an embodiment.

In the embodiment shown in FIG. 5, the reservation request 408 includes an origination circuit identifier (ID) 502, which identifies a circuit from which a video feed is to be published. The identified origination circuit can be specified in a publication request or a subscription request. In either case, the user can specify the origination circuit 502 through a user interface. In the case of a subscription request, the origination circuit 502 is a circuit that has been previously reserved via a publication request.

As discussed below in detail with reference to FIGS. 6-11, a publication reservation can be searched for through a user interface. When the desired publication is found, it can be selected through the user interface for use in creating and submitting a subscription request. By selecting a scheduled publication, the corresponding origination circuit is selected.

Continuing with FIG. 5, the reservation request 408 includes one or more destination circuit IDs 504 if the reservation request 408 is a subscription request. If the reservation request is a publication request, the reservation request 408 generally does not include destination circuit IDs 504. As discussed further below with reference to FIGS. 6-11 a user can specify the one or more destination circuit IDs 504 through a user interface. The destination circuit(s) 504 indicate the circuit(s) and location(s) where the publication is to be transmitted. Origination circuit ID 502 and destination circuit ID(s) 504 generally specify a circuit at a location, such as a given city.

In an embodiment, the reservation request 408 includes an origination start time 506A and an origination end time 506B associated with the identified origination circuit 502. For example, if the request 408 is a publication request, the origination start time 506A and the origination end time 506B specify the start and end times, respectively, of the publication to be published via the identified origination circuit 502.

The request 408 further includes one or more destination circuit start times 508 and one or more destination circuit end times 510 associated with the respective destination circuit(s) 504. If the request 408 is a subscription request, the first start time 508A and the first end time 510A correspond to the time frame for delivery of the publication to the first destination circuit 504A, the second start time 508B and the second end time 510B correspond to the time frame for delivery of the publication to the second destination circuit 504B, if any, and so on, up to destination circuit N 504N, if more than one destination circuit is specified.

In the embodiment of FIG. 5, the reservation request includes a bandwidth parameter 512. The bandwidth parameter specifies the desired bandwidth for the publication. The desired bandwidth is the user specified bandwidth for the published video feed. If the publication is reserved at 8 Megabits/second (Mbps), then by default all subscription reservations will be at 8 Mpbs. In one embodiment, the requested bandwidth is reserved up to the maximum bandwidth that the origination or destination circuit can provide.

As discussed further below, a user can specify a name (or other identifier) for a reservation. When booking a publication reservation, the user is able to provide a name for the reservation. For example a customer could give a reservation the name "Test Reservation". The name is intended to be useful to the customer for the customer to distinguish between reservations.

Continuing with the embodiment illustrated in FIG. 4, the reservation request 408 is sent to a scheduler 410. The scheduler 410 parses the reservation request and uses one or more reservation parameters in the request 408 to determine if sufficient resources are available to satisfy the requested publication or subscription. The scheduler 410 accesses a number of sets of data to determine if sufficient resources are available and schedule reserved resources. To illustrate, some data sets that may be used include port/circuits 412, CODECs 413, bandwidth 414, schedule 416, customer/affiliate sites 418 and zones 420. These data sets are discussed in detail further below.

In one embodiment, the scheduler 410 generates a reservation response 422 in response to the reservation request 408. If the scheduler 410 identifies available resources to satisfy the request 408, the response 422 confirms that resources are available and/or the available resources have been reserved. The response 422 may identify the particular resource(s) that have been reserved. If insufficient resources are available to satisfy the request 408, the response indicates that resources are not available to satisfy the request.

In some embodiments, the response 422 can indicate partial satisfaction of the request 408, when only part of the request 408 can be satisfied (e.g., sufficient resources are available for less than all specified destination circuits). For example, when a subscription request specifies multiple destinations, the response 422 may indicate that the request can be satisfied for some of the destinations, but that the request cannot be satisfied for other(s) of the destinations. The reservations interface 402 outputs the confirmation/denial based on the reservation response. When part or all of a request 408 cannot be satisfied, the user can resubmit reservation parameters. For example new reservation parameters 404 may be submitted that specify a different time for delivery of a requested video feed.

Referring again to the various data sets, ports/circuits 412 includes a list of ports and/or circuits at sites (e.g., sites 202) and/or devices (e.g., replicator 218) on a terrestrial network (e.g., network 204). The scheduler 408 can identify available ports and/or circuits for use in scheduling data feed transmissions using the ports/circuits data set 412. CODECs 413 specify one or more coding and decoding formats that data can be converted to and from. Bandwidth data set 414 includes bandwidths of associated ports and/or circuits of the ports/circuit data set 412. The scheduler 408 can use the ports/circuits 412 and associated bandwidths 414 to allocate bandwidth available on the ports and/or circuits 412 to requested publications and subscriptions.

In some embodiments, for example, the scheduler can read the specified bandwidth and circuit from a request 408 and then read the maximum bandwidth for the specified circuit from the bandwidth data set 414. If the requested bandwidth is greater than the maximum bandwidth of the specified circuit, then the request cannot be fulfilled. Otherwise, the request might be fulfilled if the specified circuit is not already overscheduled, as indicated by the times/schedule 416.

In one embodiment, time/schedule 416 includes dates and times associated with reserved resources, such as port, circuits and bandwidth. For example, the time/schedule 416 can be a calendar or other time-based register of circuit/port identifiers and/or bandwidths used on those circuits/ports at various days and times. Customer/affiliate sites data set 418 identifies customers and/or affiliate sites, such as broadcasters, who can submit reservation requests and communicate via the terrestrial network. Zones data set 420 includes a list of zones (e.g., geographical or logical) associated with one or more sites in the customer/affiliate sites data set 418.

In one embodiment the scheduler 408 uses the customer/affiliate sites 418 to identify communities of interest and/or to determine if a particular port can be used by a requester. For example, a requester that is not an affiliate of a site from which a publication is being requested typically cannot reserve a private port of the specified site. The scheduler therefore determines from the customer/affiliate sites 418 whether particular ports can be reserved by each requester. The scheduler can determine if the requester is in particular zone, as indicated in zones data set 420, to thereby determine a preferred publication site from which to transmit a requested video feed.

In at least one embodiment, a configuration module 424 is in communication with the scheduler 408 and terrestrial network devices, such as NAU 212 and/or replicator 218. The configuration module 424 is operable to configure the terrestrial network devices according to the schedule 416. The scheduler 408 sends configuration messages 426 to the configuration module 424 to notify the configuration module 424 of scheduled events, times and/or reserved resources. For example, configuration messages 426 may identify a port and/or circuit to be configured to transmit or receive a video feed at a certain time. Based on configuration messages 426, the configuration module 424 generates one or more configuration commands 428, which are transmitted to associated terrestrial network devices to thereby configure the devices to transmit or receive at scheduled days/times.

Turning to FIGS. 6-11, there are shown a number of user interfaces for submitting publication and subscription parameters. In one embodiment, the user interfaces are provided by a reservation web-server based in a network, such as administration network 106 (FIG. 1). Users based at sites (e.g., sites 102, FIG. 1) can log into the reservation web-server via a computer, such as computer 220 of FIG. 2. As discussed above, the computer may execute a browser application that enables the user to navigate to web page interfaces such as those shown in FIGS. 6-11.

Figure 6:
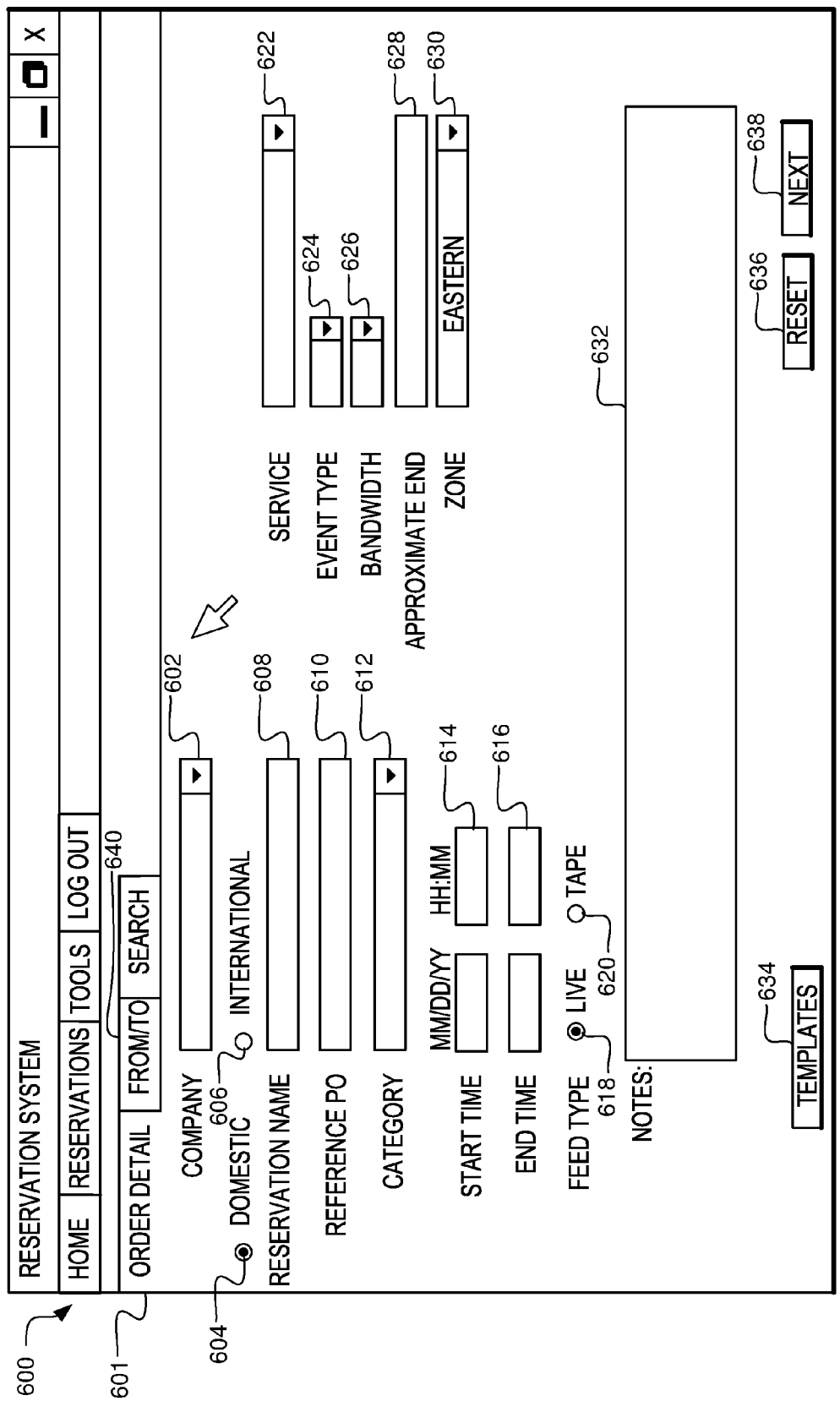
FIG. 6 illustrates an example user interface for entering subscription or publication request details according to an embodiment.

Turning to FIG. 6, there is shown a user interface 600 through which reservation details can be entered in an order detail tab 601. A company name can be selected in a company name field 602. The company name corresponds to the customer for which the reservation is being requested. Using a drop down arrow of the company name field 602, a list of company names is presented from which the user can select. The general location associated with the reservation may be selected as either domestic or international using a domestic radio button 604 and an international radio button 606. In this embodiment, international refers to locations outside the United States. Other embodiments do not include domestic radio button 604 or international radio button 606.

A unique reservation name can be entered in a reservation name field 608. A reference purchase order (PO) associated with the reservation can be entered in a reference PO field 610. A category field 612 enables the user to enter/select a category associated with the reservation. By clicking on the drop down arrow of the category field 612, a list of possible categories is presented. In one embodiment, possible categories include entertainment/programming, news, production/advertisements, video conference, other, and unknown.

Start time field(s) 614 enable the user to enter the start date and the start time of the reservation. End time field(s) 616 enable the user to enter the end date and end time of the reservation. In one embodiment reservations are booked using a 24-hour clock system, wherein midnight start of day (12:00 AM) is entered as 00:00, noon/12:00 PM is entered as 12:00, and midnight end of day is entered as 24:00. In this embodiment end date and time does not exceed 24 hours.

In the illustrated embodiment, feed type is entered using a live radio button 618 and a tape radio button 620. Live radio button 618 should be selected if the reservation corresponds to a live video feed; tape radio button 620 should be selected if the reservation corresponds to a taped video feed.

Through a service field 622 a service type can be selected. In one embodiment digital service is selected if core replicator/publish and subscribe functionality are used. Through an event type field 624 a type of event can be selected. In one embodiment, ASI OCA can be selected, for example, if core replicator/publish and subscribe functionality are used.

In the illustrated embodiment, bandwidth (e.g., bit rate) of the reserved video feed is entered/selected in a bandwidth field 626. Through an approximate end field 628, an approximate end time can be entered. In one embodiment, a 15 minute approximate end time is allowed for reservations less than 60 minute and a 30 minute approximate end is allowed for reservations 60 minutes or more.

In one embodiment, through a time zone field 630, the time zone of the reservation can be selected. In a note field 632, notes may be entered to further explain the reservation. In one embodiment, any entered notes appear on a customer confirmation letter for the customer's use.

In one embodiment, a templates button 634 can be selected to choose a reservation template. A reservation template includes preset parameters. A reset button 636 can be selected to reset parameters previously entered in the fields. In the illustrated embodiment a next button 638 can be selected after the order detail parameters have been entered. Upon selecting the next button 638, a "From/To" tab 640 is presented.

Figure 7:
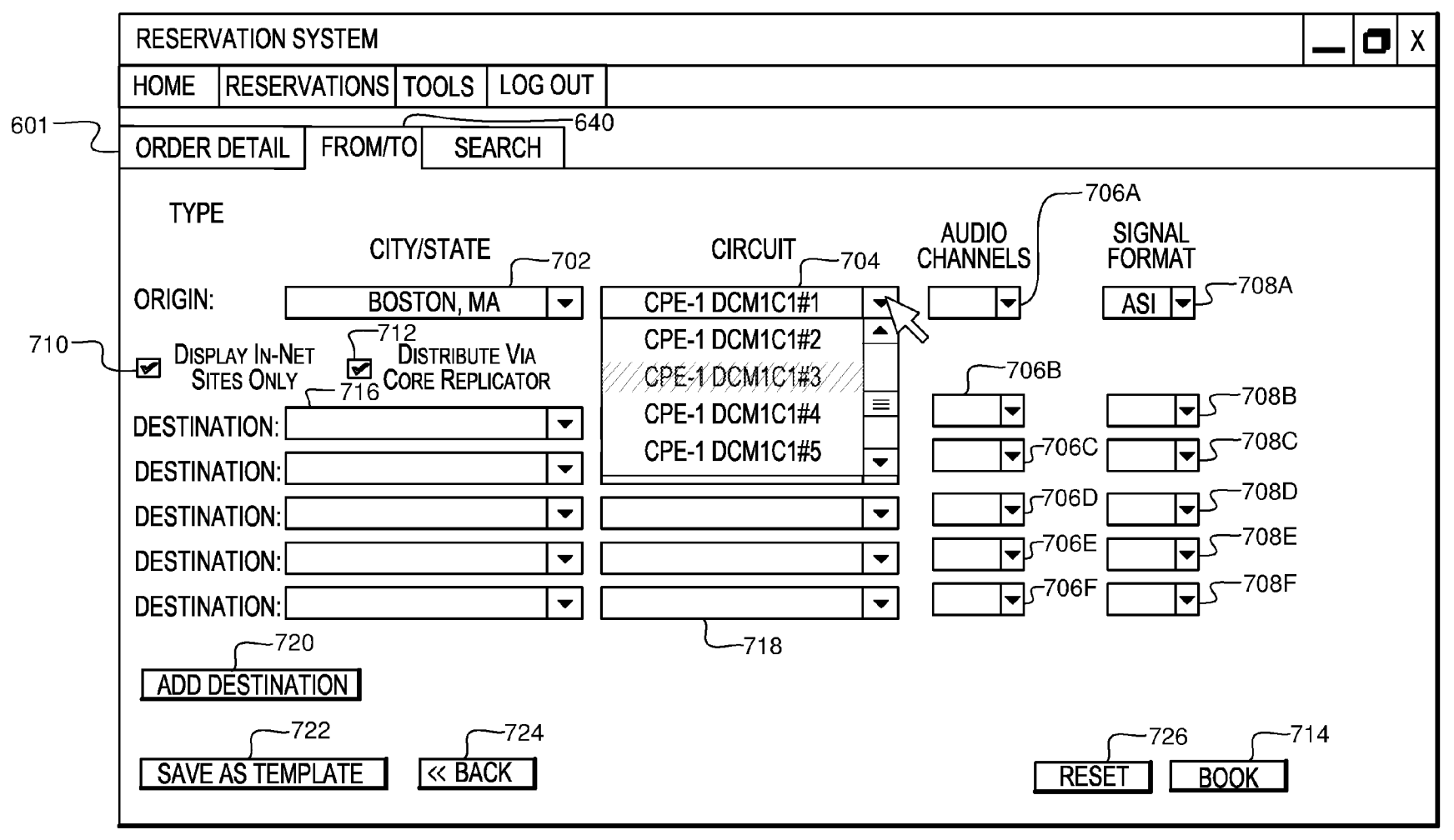

An embodiment of the From/To tab 640 is shown in FIG. 7. Through the From/To tab 640 origin circuit/location parameters and destination circuit/location parameters can be entered. Through an origin location field 702, the location (e.g., city and state of origin site) of the origin circuit can be selected. Through an origin circuit field 704, an origin circuit identifier can be selected. The origin location and origin circuit correspond to the location and circuit, respectively, from which the associated video feed will be published. Through an audio channel field 706A, the number of audio channels can be indicated for the origin circuit video feed. Through a signal format field 708A a signal format can be selected for the origin circuit video feed. In one embodiment, the signal format may be ASI or others.

In the illustrated embodiment, an in-net sites check box 710 can be checked to display only sites of the company that is making the reservation. In other words, "in-network" refers to member sites of the community of interest for which the reservation is being made. In one embodiment, only private ports/circuits will be shown if the in-net check box is checked. If the in-net check box 710 is not checked, public ports/circuits appear in addition to the private ports/circuits. If the in-net check box 710 is unchecked, the user can view every circuit that the user/company has permission to view (e.g., public, private, in-network).

In the illustrated embodiment, a core replicator checkbox 712 enables the user to designate whether the associated video feed will be distributed via a core replicator (e.g., replicator 218, FIG. 2). In one embodiment, the core replicator checkbox 712 is checked by default. The core replicator check box 712 allows the user to create 'core replicator' or 'publication' reservations so that other sites can subscribe to the publications as desired. If the core replicator checkbox 712 is checked, then destinations do not need to be selected. When the user is submitting only a publication reservation, the user should check (i.e., select) the core replicator checkbox 712 to opt for core replication or publication. A book button 714, discussed further below, can then be selected to submit the publication reservation.

If the reservation request that is being created is a subscription request, destination parameters, such as sites/locations, are also specified through the from/to tab 640. In the illustrated embodiment, destination locations and circuits can be selected through one or more destination location fields 716 and destination circuit fields 718, respectively. In the illustrated embodiment, the destination location fields 716 and destination circuit fields 718 are drop down lists of options that can be selected by the user. For each destination location and circuit, there is an associated audio channel field 706 and signal format field 708, through which the user can select an associated audio channel and signal format, respectively.

In one embodiment, an add button 720 can be selected to add another destination. When the user selects the add button 720, another set of destination location field 716, destination circuit field 718, audio channel field 706 and signal format field 708 are presented. The user can use the added fields to enter parameters of the additional destination that is to receive the video feed.

In the embodiment of FIG. 7, a save as template button 722 enables the user to save all currently entered reservation parameters as a template. Once saved as a template, the user can later retrieve the template parameters in future request submissions. A back button 724 enables the user to return to the order details tab 601. A reset button 726 can be selected to reset the parameter fields. In one embodiment, selection of the reset button 726 clears data from all fields on the from/to tab 640. After all desired origination and destination parameters are entered, the user can select the book button 714 to submit the reservation request parameters.

Figure 8:
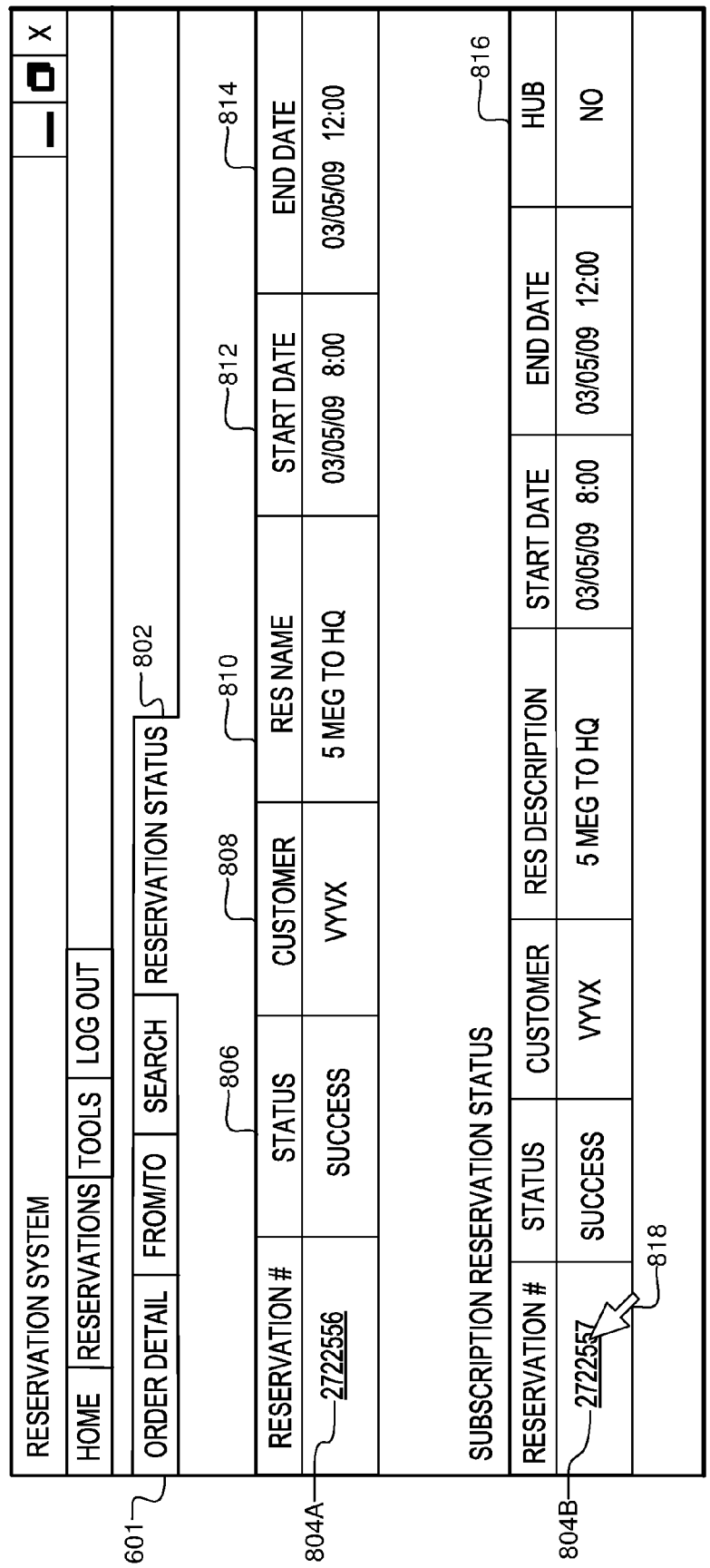
FIG. 8 illustrates an example user interface presenting an example reservation request confirmation according to an embodiment.

After the user clicks the book button 714, a reservation status tab 802 is presented, as shown in FIG. 8, according to one embodiment. The reservation status tab 802 shows the status of the reservation request. Possible statuses are success and failed. In the example shown in FIG. 8, the shown reservation requests are successful, meaning resources were able to be reserved and the reservation was scheduled consistent with the requests. The reservation status tab 802 presents one or more reservation identifiers, such as reservation numbers 804, uniquely identifying respective reservation requests.

In the illustrated embodiment, certain reservation information is shown in association with the reservation numbers 804, such as, the status 806 (e.g., success, fail, confirmed, unconfirmed, pending, etc.), customer name 808, reservation name 810, start date 812, end date 814, or hub specification 816. In this embodiment, the reservation name 810 corresponds to the reservation name designated in reservation name field 608 (FIG. 6). The reservation number 804 can be selected by the user. For example, the reservation number 804 may be embodied in a selectable hyperlink. When the user clicks on (e.g., selects with a mouse pointer, 818), a reservation request confirmation is generated.

In one embodiment, illustrated in FIG. 9, the reservation request confirmation 902 is presented in a popup window within the reservation status tab 802. The reservation confirmation 902 presents numerous details about the reservation request, such as, but not limited to, customer name, reservation name, confirmation number, purchase order number, start date, start time, end date, end time, contact information (e.g., phone number, fax number name), service type, product, event, bandwidth, origination location, and destination location (if any). In one embodiment, when the user clicks on the reservation number 804, the confirmation 902 including reservation details is sent to the user through some delivery means, such as regular mail, electronic mail, or text messaging.

FIG. 10 illustrates a user interface 1000 through which publication reservations can be searched. The user interface 1000 includes a search tab 1002 through which a user can enter one or more publication reservation criteria. Previously scheduled publications are searched to find publications that correspond to the publication criteria entered by the user in the search tab 1002. For example, the user can enter a time frame by entering a "from" date and a "to" date. The from date is entered in a "from" date field 1004 and the to date is entered in a "to" date field 1006.

In the illustrated embodiment of FIG. 10, the user can enter a reservation ID in a reservation ID field 1008. The user may select a reservation status using a reservation status field 1010. The user may also select a site using a reservation site field 1012. In the case of ID field 1008 status field 1010, and site field 1012, the default condition is "ALL", meaning a reservation matches the search criteria, regardless of reservation ID, status, and site, if other criteria match. In the illustrated embodiment, a companies field 1014 is used to specify company search criteria.

When the user has entered the publication reservation search criteria, the user can select a submit button 1016 to submit the search criteria and begin the search for publication reservations that match the search criteria. By selecting a reset button 1018, the user can reset (e.g., clear) all search criteria fields. After clicking on the submit button 1016, publication reservations that are found that meet the entered criteria are presented to the user.

An embodiment of a publication reservation search results summary 1102 is shown in FIG. 11. In general, the publication reservation search results 1102 list publication reservations that match the one or more search criteria entered (or defaulted to) on the search tab 1002 of FIG. 10. Through the interface of FIG. 11, the user can subscribe to publication reservations that are presented among the one or more search results. By selecting (e.g., clicking on) a back button 1104, the user can go back to the search criteria specification tab 1002 of FIG. 10 to change search criteria.

With further regard to the search results, in one embodiment, search results are presented in the form of a table 1102. In the illustrated embodiment, the search results table 1102 includes customer name (or name abbreviation) 1106, reservation ID 1108, reservation name 1110, reservation status 1112, start time 1114, end time 1116, and origin location 1118 for each publication reservation found in the search. In addition, a destination button 1120 and/or a subscribe button 1122 can also be presented for each publication reservation.

In an embodiment, by selecting a destination button 1120, the user can view existing subscription reservations associated with the related publication reservation. When the destination button 1120 is selected, another tab or window (not shown) is presented that lists the destinations (e.g., locations and circuits) to which the publication will be transmitted. Other destination parameters may also be shown.

In an embodiment, by selecting a subscribe button 1122, the user can enter subscription request parameters to subscribe to the associated publication. In this embodiment, when the user selects a subscribe button 1122, an order detail tab (e.g., order detail tab 601 or from/to tab 640) or related subscription parameter entry window is presented. The user can then specify subscription request parameters. After the user has entered subscription parameters, a scheduling application attempts to schedule resources for routing the requested subscription (e.g., video feed) based on time parameters and other specified parameters (e.g., bandwidth).

Figure 12:
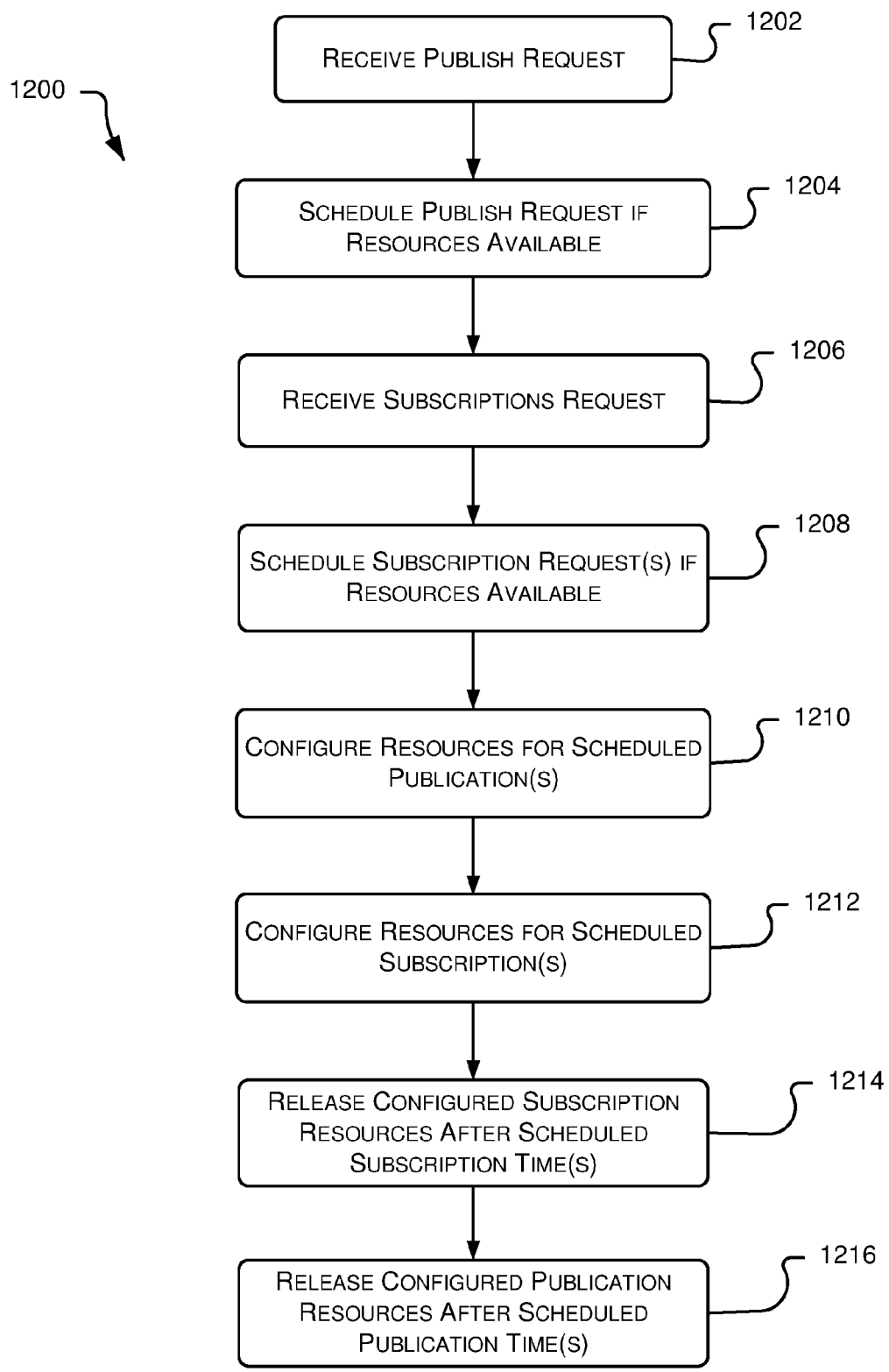
FIG. 12 is a flow chart illustrating an example algorithm for carrying out data feed resource reservation according to an embodiment.

FIG. 12 is a flow chart illustrating an example algorithm 1200 for carrying out data feed resource reservation according to an embodiment. The steps shown in FIG. 12 may be carried out by a video feed subscription system such as the system shown in FIG. 4, or a similarly configured system. The order of operations in the algorithm 1200 may be altered from the order shown in FIG. 12, depending on the particular implementation. In addition, depending on the implementation, one or more steps may be optional. For example, although FIG. 12 shows an operation for receiving a publishing request and scheduling the publishing request, these steps need not be performed in the algorithm 1200. Rather, steps related to handling publishing requests may be performed, for example, in a different process and/or by a separate system.

Turning now to the details of the algorithm 1200, a receiving operation 1202 receives a publish request. The publish request may take the form shown in FIG. 5, described above. Alternatively, the publish request may take a different form. Generally, the publish request is a request to make a data feed, such as a video feed, available for publication at or within some specified time (e.g., a time frame). The publish request specifies other parameters of the publication, such as, but not limited to, bandwidth, resources (e.g., origination circuit) to be used, publication start and end time, public/private port, location of publication or a zone of publication.

A scheduling operation 1204 schedules the data feed publication requested in requesting operation 1202 if resources are available for publishing the data feed. An embodiment of the scheduling operation 1204 determines whether resources are available. For example, the scheduling operation 1204 may determine whether one or more ports are available on data transmission equipment located at one or more sites. In this and/or other embodiments, the scheduling operation 1204 progresses through a prioritized scheme, in which sites in higher priority zones are checked first for resources.

In at least one embodiment, the scheduling operation 1204 selects ports of data transmission equipment based on the bandwidth required for transmission. In this and/or other embodiments, the scheduling operation 1204 selects one or more ports based on whether the ports are designated as public or private and/or whether the publication request specifies a public or private port.

In one embodiment of the scheduling operation 1204, the user can specify the origin and destination circuits that the public/private port designation comes into play. Certain public and/or private ports may be available for the user to select from, while other ports may not be available, depending on whether the user has permission to subscribe to those ports. The user is only enabled to select from ports that are available to the user. For example, if user A at customer A isn't granted the ability to book to a private port for customer B, then user A at Customer A will not be provided the option to select customer B's private circuit/port in the GUI to request that as an origin or destination.

Another receiving operation 1206 receives a subscription request. The subscription request specifies a scheduled publication. In some embodiments, the subscription request is in the form shown in FIG. 5 and described above, although other forms of the subscription request may be used. In some embodiments, the subscription request includes one or more parameters, including, but not limited to, a specified publication, bandwidth, origination circuit, one or more destination circuits, and one or more respective start and end times.

Another scheduling operation 1208 schedules the subscription request if sufficient resources are available. In one embodiment, the scheduling operation 1208 first validates the subscription request. Validating the subscription request typically involves determining if the format and parameters of the subscription request are proper. For example, the one or more start and end times may be validated to ensure that they fall within the start and end time of the specified publication to which the subscription request is subscribing.

With further regard to scheduling operation 1208, in one embodiment, resource assignments begin at the termination point of the publish request. The scheduling system keeps track of where the publication terminates (on which Core Replicator device). In this embodiment the requested publication is then routed and confirmed before any subscriptions to the publication are confirmed.

In an embodiment of the scheduling operation 1208, if the subscription request is valid, the scheduling operation 1208 determines if sufficient resources are available to transmit the specified published data feed according to parameters of the subscription request. In an embodiment, the scheduling operation 1208 performs time-based routing of data feed. Time-based routing involves reserving resources for delivery of the data feed prior to delivery of the data feed. For example, a particular amount of bandwidth can be reserved on particular port. Reserving the bandwidth or other resource can involve specifying the amount of reserved bandwidth on a port in memory (e.g., port 412, bandwidth 414 (FIG. 4)).

An embodiment of the scheduling operation 1208 iterates through each of one or more specified destination circuits and respective start and end times, checking whether one or more ports on data transmission devices have sufficient available bandwidth at the specified times to transmit the data feed. This may involve checking a schedule (e.g., schedule 416 (FIG. 4)) of prior port reservations to determine how much bandwidth has been reserved on the ports of the specified destination circuit(s) at the specified time(s). A particular amount of bandwidth that is available may be reserved. As such, port or circuit bandwidth can be allocated on a time basis.

In one embodiment, if the scheduling operation 1208 determines that the subscription request is valid and sufficient resources are available, the available resources are reserved. If resources are not available for a subscription request, or for a portion of a subscription request, a notification is sent that indicates the inability to reserve resources for the subscription request or the portion of the subscription request. For example, if the subscription request specifies eight destination circuits with eight respective start and end times, and resources are available for only seven of the eight destinations at the specified times, a message is sent indicating that the eighth request cannot be satisfied. In this example, confirmations are sent confirming that the first seven requested subscriptions have been reserved. Accordingly, embodiments allow for partial subscription confirmation, wherein if one part of a subscription request cannot be satisfied, other parts of the subscription request are not denied for which resources are available.

A configuring operation 1210 configures the scheduled publication resources that were reserved in scheduling operations 1204 so that the reserved resources publish the data feed(s) at the scheduled time(s). Another configuration operation 1212 configures subscription resources that were reserved in scheduling operation 1208 so that the scheduled resources will transmit and receive the published data feed(s) at the scheduled time(s). In some embodiments, the configuring operation 1210 and configuring operation 1212 provision the data feed transmission and reception devices at the origination and one or more destinations to transmit and receive, respectively, the published data feed.

A releasing operation 1214 releases the reserved subscription resources after transmission and reception of the published data feed. Another releasing operation 1216 releases the reserved publication resources after transmission of the published data feed. In some embodiments, the releasing operations 1214 and 1216 each occur as a step for each publication/subscription process. In another embodiment, the releasing operations 1214 and 1216 each occur as a periodic batch operation in which the resource reservation schedule is periodically reviewed and reservations older than the current time are removed from the schedule.

FIG. 13 is a schematic diagram of a computer system 1300 upon which embodiments of the present invention may be implemented and carried out. For example, one or more computing devices 1300 may be configured to schedule subscription and reservation requests and reserve available resources to deliver data feeds based on the requests. Computer system 1300 generally exemplifies any number of computing devices, including general purpose computers (e.g., desktop, laptop or server computers) or specific purpose computers (e.g., embedded systems).

According to the present example, the computer system 1300 includes a bus 1301 (i.e., interconnect), at least one processor 1302, at least one communications port 1303, a main memory 1304, a removable storage media 1305, a read-only memory 1306, and a mass storage 1307. Processor(s) 1302 can be any known processor, such as, but not limited to, an Intel® Itanium® or Itanium 2® processor(s), AMD® Opteron® or Athlon MP® processor(s), or Motorola® lines of processors.

Communications ports 1303 can be any of an RS-232 port for use with a modem based dial-up connection, a 10/100 Ethernet port, a Gigabit port using copper or fiber, or a USB port. Communications port(s) 1303 may be chosen depending on a network such as a Local Area Network (LAN), a Wide Area Network (WAN), or any network to which the computer system 1300 connects. The computer system 1300 may be in communication with peripheral devices (e.g., display screen 1330, input device 1316) via Input/Output (I/O) port 1309.

Main memory 1304 can be Random Access Memory (RAM), or any other dynamic storage device(s) commonly known in the art. Read-only memory 1306 can be any static storage device(s) such as Programmable Read-Only Memory (PROM) chips for storing static information such as instructions for processor 1302. Mass storage 1307 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1301 communicatively couples processor(s) 1302 with the other memory, storage and communications blocks. Bus 1301 can be a PCI/PCI-X, SCSI, or Universal Serial Bus (USB) based system bus (or other) depending on the storage devices used. Removable storage media 1305 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions, which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 1304 is encoded with a data feed resource reservation application 1350-1 that supports functionality as discussed herein. For example, data feed resource reservation application 1350-1 can include the reservations interface 402, the scheduler 408 and/or the configuration module 424 of FIG. 4. Data feed resource reservation application 1350-1 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1302 accesses main memory 1304 via the use of bus 1301 in order to launch, run, execute, interpret or otherwise perform the logic instructions of the data feed resource reservation application 1350-1. Execution of data feed resource reservation application 1350-1 produces processing functionality in data feed resource reservation process 1350-2. In other words, the data feed resource reservation process 1350-2 represents one or more portions of the data feed resource reservation application 1350-1 performing within or upon the processor(s) 1302 in the computer system 1300.

It should be noted that, in addition to the data feed resource reservation process 1350-2 that carries out operations as discussed herein, other embodiments herein include the data feed resource reservation application 1350-1 itself (i.e., the un-executed or non-performing logic instructions and/or data). The data feed resource reservation application 1350-1 may be stored on a computer readable medium (e.g., a repository) such as a floppy disk, hard disk or in an optical medium. According to other embodiments, the data feed resource reservation application 1350-1 can also be stored in a memory type system such as in firmware, read only memory (ROM), or, as in this example, as executable code within the main memory 1304 (e.g., within Random Access Memory or RAM). For example, data feed resource reservation application 1350-1 may also be stored in removable storage media 1305, read-only memory 1306, and/or mass storage device 1307.

Example functionality supported by computer system 1300 and, more particularly, functionality associated with data feed resource reservation application 1350-1 and data feed resource reservation process 1350-2 is discussed above in detail with reference to FIGS. 1-12.

In addition to these embodiments, it should also be noted that other embodiments herein include the execution of the data feed resource reservation application 1350-1 in processor(s) 1302 as the data feed resource reservation process 1350-2. Thus, those skilled in the art will understand that the computer system 1300 can include other processes and/or software and hardware components, such as an operating system that controls allocation and use of hardware resources.

In another embodiment, the reservations interface 402 (FIG. 4) is hosted on one or more Windows™ Virtual Machines (VMs), the scheduler 410 executes on one or more Unix Solaris™ 10 servers, the configuration modules 424 run on Hewlett Packard™ servers running the Hewlett Packard Unix operating system, and the databases run on one or more Unix Solaris 10™ servers.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

Various modifications and additions can be made to the example embodiments discussed herein without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method of managing delivery of a video feed over a terrestrial network, the method comprising:
   receiving, by at least one computing device, a publish request to make a video feed available within a publication time range;
   receiving, by the at least one computing device, a subscription request specifying one or more destination sites to receive the video feed and respective times at which to deliver the video feed to each of the one or more destination sites;
   determining that the respective delivery times are within the publication time range;
   identifying, by the at least one computing device, one or more available network resources that are available at the respective delivery times, wherein the step of identifying comprises:
      determining whether there is sufficient bandwidth on one or more ports of a video feed delivery device to deliver the requested video feed at each of the respective delivery times;
   configuring the one or more available network resources to deliver the requested video feed to the one or more destination sites at the respective delivery times; and
   de-allocating the available network resources after delivery of the requested video feed.

2. The method of claim 1, wherein configuring available resources comprises reserving one or more ports of a replicator to deliver the requested video feed at the respective delivery times.

3. The method of claim 1, further comprising sending a rejection message if there is insufficient bandwidth available to deliver the requested video feed at a requested delivery time.

4. The method of claim 1, further comprising sending a reservation confirmation message confirming that resources are available to deliver the requested video feed if sufficient bandwidth is available.

5. The method of claim 1, wherein configuring available resources comprises determining if resources are available to deliver the requested video feed at each of the one or more delivery times, and if resources are not available to deliver the requested video feed to one of the one or more destination sites, and resources are available to deliver the requested video feed to the other one or more destination sites, configuring only the available resources to deliver the video feed to the other destination sites at the respective delivery times.

6. A system for managing delivery of video feeds over a terrestrial network, the system comprising:
   at least one processor;
   memory, operatively connected to the at least one processor and containing instructions that, when executed by the at least one processor, cause the at least one processor to:
      receive a publish request to make a video feed available within a publication time range;
      receive a subscription request specifying a video feed and a plurality of requested delivery times and a respective plurality of destinations;
      determine that the respective delivery times are within the publication time range;
      determine a subset of the plurality of destinations to which the video feed can be delivered at one or more respective requested delivery times;
      select a destination location from among the subset of destination locations to which the video feed can be delivered at the one or more respective requested delivery times;
      reserve available network resources at the one or more respective requested delivery times for delivering a video feed to the selected destination location;
      configure the available network resources for delivering the video feed to the selected destination location at the one or more respective requested delivery times; and
      after the one or more requested delivery times have lapsed, mark the available network resources as no longer allocated to delivering the video feed.

7. The system of claim 6, wherein the instructions further cause the at least one processor to determine whether sufficient network resources are available at an origination location and each of the plurality of destinations at the plurality of respective delivery times.

8. The system of claim 6, wherein instructions further cause the at least one processor to select the destination location based on zones of locations.

9. The system of claim 6, wherein instructions further cause the at least one processor to provide an online interface for subscribing to video feeds to be published.

10. The system of claim 9, wherein the online interface presents video feeds that will be published and wherein the online interface receives subscriptions to one or more selected video feeds.

* * * * *